(12) United States Patent
Tsai (10) Patent No.: US 8,621,783 B2
(45) Date of Patent: Jan. 7, 2014

(54) HOLLOW POT

(76) Inventor: Chin-Tai Tsai, Taichung (TW)

( * ) Notice: Subject to any disclaimer, the term of this patent is extended or adjusted under 35 U.S.C. 154(b) by 118 days.

(21) Appl. No.: 13/168,021

(22) Filed: Jun. 24, 2011

(65) Prior Publication Data

US 2011/0314733 A1    Dec. 29, 2011

(30) Foreign Application Priority Data

Jun. 28, 2010  (TW) .............................. 99212214 A
Feb. 8, 2011   (TW) .............................. 100104138 A (51) Int. Cl.
*A01G 27/02* (2006.01)

(52) U.S. Cl.
USPC ................................................ 47/79; 47/48.5

(58) Field of Classification Search
USPC .......... 47/65.5, 65.7, 66.1, 66.6, 66.7, 79, 81, 47/48.5, 80, 62 R, 59 R, 86, 65
See application file for complete search history.

(56) References Cited

U.S. PATENT DOCUMENTS

| | | | | |
|---|---|---|---|---|
| 2,695,474 A * | 11/1954 | Barstow | ........................... | 47/81 |
| 4,001,967 A * | 1/1977 | Swift et al. | ........................ | 47/80 |
| 4,171,593 A * | 10/1979 | Bigglestone | ...................... | 47/79 |
| 4,356,665 A * | 11/1982 | de Oliveira | ........................ | 47/80 |
| 4,745,707 A * | 5/1988 | Newby | ............................... | 47/79 |
| 4,885,870 A * | 12/1989 | Fong | .................................. | 47/79 |
| 4,916,858 A * | 4/1990 | Hobson | ............................. | 47/81 |
| 4,993,186 A * | 2/1991 | Immonen | ......................... | 47/79 |
| 5,502,924 A * | 4/1996 | Lee | ................................... | 47/79 |
| 6,219,969 B1* | 4/2001 | Dion | ................................. | 47/79 |
| 6,363,658 B1* | 4/2002 | Lai | ................................... | 47/79 |
| 6,374,541 B1* | 4/2002 | Ho | ................................... | 47/79 |
| 6,505,440 B1* | 1/2003 | Lai | ................................... | 47/79 |
| 7,703,240 B2* | 4/2010 | Watson et al. | .................... | 47/79 |
| 7,730,666 B2* | 6/2010 | Spray | ................................ | 47/79 |
| 8,143,292 B2* | 3/2012 | Schmidt et al. | ............... | 514/341 |
| 2007/0022660 A1* | 2/2007 | Buitendag et al. | ............... | 47/81 |
| 2009/0293354 A1* | 12/2009 | Goldberg et al. | ............. | 47/66.6 |
| 2012/0186155 A1* | 7/2012 | Tsai | .................................. | 47/79 |

* cited by examiner

*Primary Examiner* — T Nguyen (57) ABSTRACT

A hollow pot includes a pot unit and a connection unit. The connection unit is a hollow unit and installed to inner surface of a mold set before pressurized air is introduced in the mold set and before the mold set is closed. A probe is inserted into the mold set and blows the plastic material in the mold set. The plastic material expands and contacts against the inner surface of the mold set and seals the connection holes of the connection unit. The plastic material is extended and broken to match upon the connection holes of the connection unit. The plastic material is solidified to form the pot unit. The pot unit is air-tightly connected to the connection unit, and the conjunction area of the connection unit communicates with the space in the pot unit.

6 Claims, 13 Drawing Sheets

HOLLOW POT

FIELD OF THE INVENTION

The present invention relates to a pot, and more particularly, to a hollow pot with a space defined therein so as to store water in the space to provide the plant sufficient water.

BACKGROUND OF THE INVENTION

A conventional pot for plant generally is made by pottery clay, porcelain or plastic, and includes a single layer with the inside and the outside. A hole is defined in the bottom of the pot which has an open top so that soil is put in the pot via the open top. The plant is planted in the soil.

However, people in the modern world are busy and may not able to regularly water the plant and some people thought that the more water to the plant, the healthier the plant will be so that more than needed water is poured to the pot and the water that cannot be absorbed by the soil leaks from the hole in the bottom of the pot. The water and the soil that leak from the hole of the pot directly drop to the floor and form dark spots which are difficult to clean up. If the pot is located at a higher position, the leakage may generate noise. In the daytime, the temperature in the pot increases so that the humidity and temperature are trapped in the soil so that the roots of the plant are easily decayed. Besides, if the owner leaves for couple of days, the plant will be dead because no water is supplied.

The present invention intends to provide a hollow pot for plant and has a space defined between inner and outer layers of the pot, and water is stored in the space so as to adjust temperature and humidity in the soil efficiently. In consequence, the hollow pot will be able to solve these problems and benefit to more manufacturers and consumers.

SUMMARY OF THE INVENTION

The present invention relates to a hollow pot which comprises a pot unit and a connection unit. The connection unit is a hollow unit and installed to inner surface of a mold set before pressurized air is introduced in the mold set and before the mold set is closed. A probe is inserted into the mold set and blows the plastic material in the mold set. The plastic material expands and contacts against the inner surface of the mold set and seals the connection holes of the connection unit. The plastic material located outside of the connection holes is forced and pushed into the connection holes due to pressure difference by continuously introducing air into the mold set. The plastic material is extended and broken to match upon the connection holes of the connection unit. The plastic material is solidified to form the pot unit. The pot unit is air-tightly connected to the connection unit, and the conjunction area of the connection unit communicates with the space in the pot unit. The hollow pot is made by two different materials and by way of air blow molding. There will be not necessary to drill after the pot is made and no extra machining is needed. The transparent window is connected to the outer layer of the pot unit so that the level of liquid in the space is observed via the transparent window.

Furthermore, the liquid in the space of the pot moves upward via the path due to siphon effect so that the soil in the reception area absorbs the water. The pressure of inside the space is lower than the atmosphere so that the pressure is supplied into the space via the path to let the water in the space to move upward to automatically water the soil. Therefore, the soil of the pot is always supplied by small amount of water and the humidity of the soil is proper for the roots of the plant. The special arrangement allows the owners of the plant to travel for a period of days while the soil is supplied sufficient water.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 11, the hollow pot of the present invention comprises a pot unit 1 and a connection unit B.

The pot unit 1 has an inner layer 10 with a recessed reception area 13 defined therein, an outer layer 11 supporting the inner layer 10, and a space 12 located between the inner and outer layers 10, 11. A through hole 133 is located in communication between the reception area 13 and the space 12. A water introducing unit 3 is located in communication between the space 12 and outside of the pot unit 1. A seal unit 6 seals the water introducing unit 3, and a path A communicates between the space 12 and the outside of the pot unit 1. The reception area 13 of the inner layer 10 has a recessed area 131 and at least one through hole 133 is defined in the recessed area 131. The through hole 133 communicates with the space 12. The through hole 133 is integrally formed simultaneously with the formation of the pot unit 1, or the through hole 133 is formed by drilling action after the pot unit 1 is formed.

Figure 11:
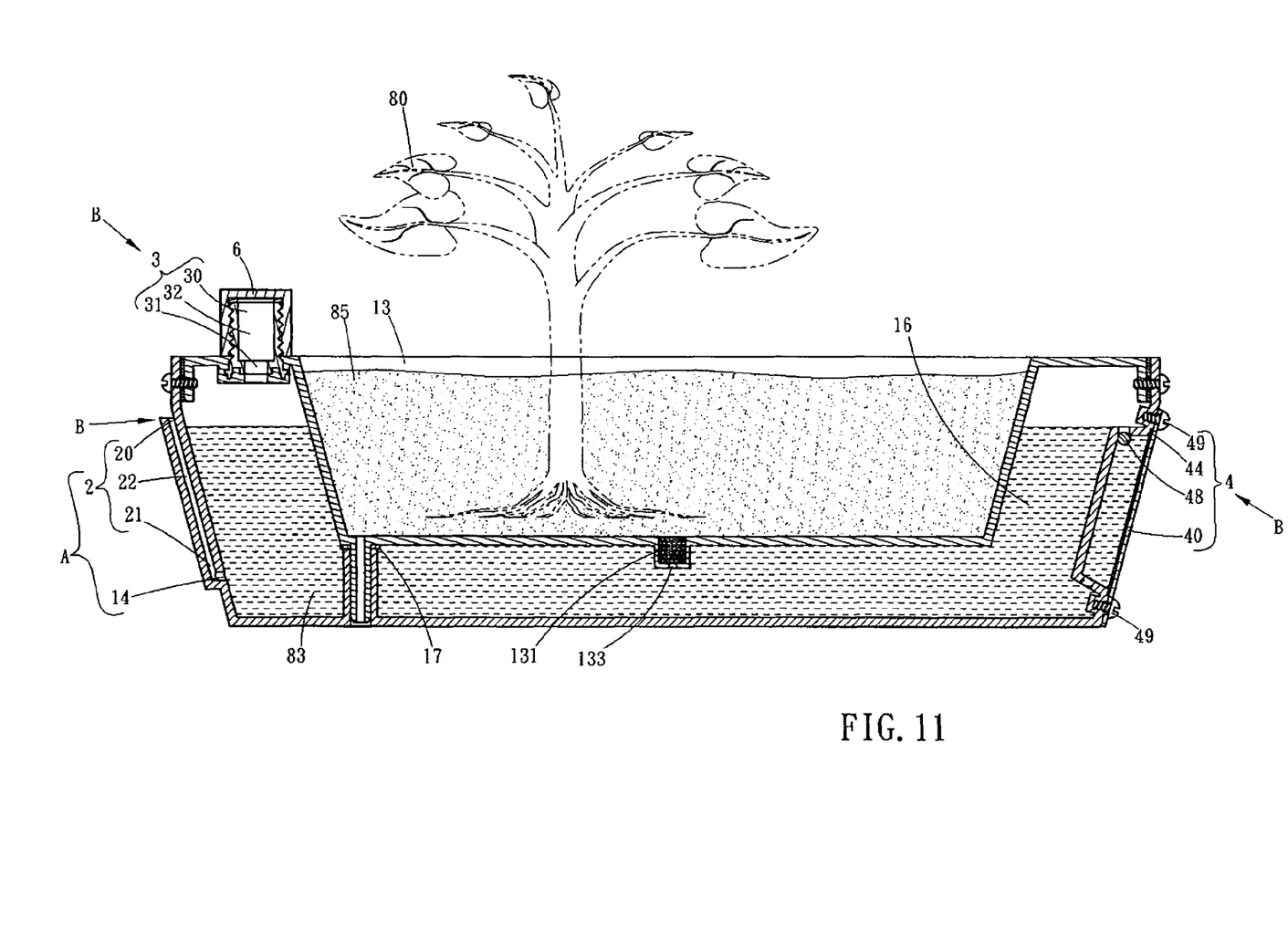
FIG. 11 shows a fourth embodiment of the pot wherein a plant is planted in the soil in the pot.

The inner layer 10 of the space 12 is air-tightly in contact with the outer layer 11. The seal unit 6 seals the water introducing unit 3 so as to form an enclosed area in the space 12 in the pot unit 1. As shown in FIGS. 1 to 8, the inner and outer layers 10, 11 are integrally formed by air blow molding, or as shown in FIG. 11, the inner and outer layers 10, 11 are two individual layers and are connected to each other, and a seal member 17 is located between the inner and outer layers 10, 11 to ensure that the space 12 is an enclosed space.

The enclosed area in the space 12 is defined between the water introducing unit 3 sealed by the seal unit 6 and an inlet 14 (the second connection hole 21 where the space 12 communicates with the pipe 2). Alternatively, the enclosed area in the space 12 is defined between the through hole 133 and the water introducing unit 3 sealed by the seal unit 6. Alternatively, enclosed area in the space 12 is defined between the contact area between the pipe 2 and the pot unit 1, and the water introducing unit 3 sealed by the seal unit 6.

Figure 8:
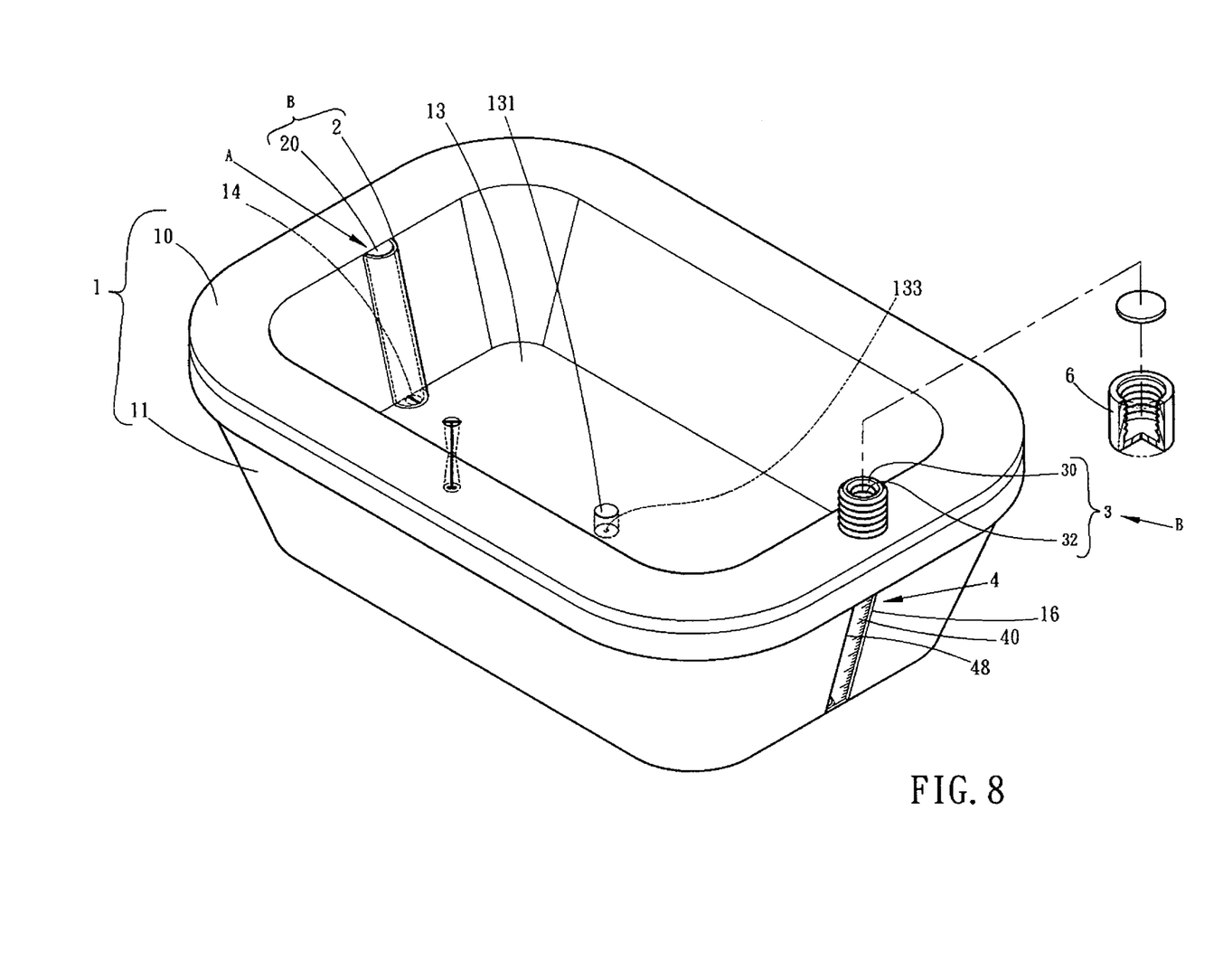
FIG. 8 shows a second embodiment of the pot of the present invention.
Figure 9:
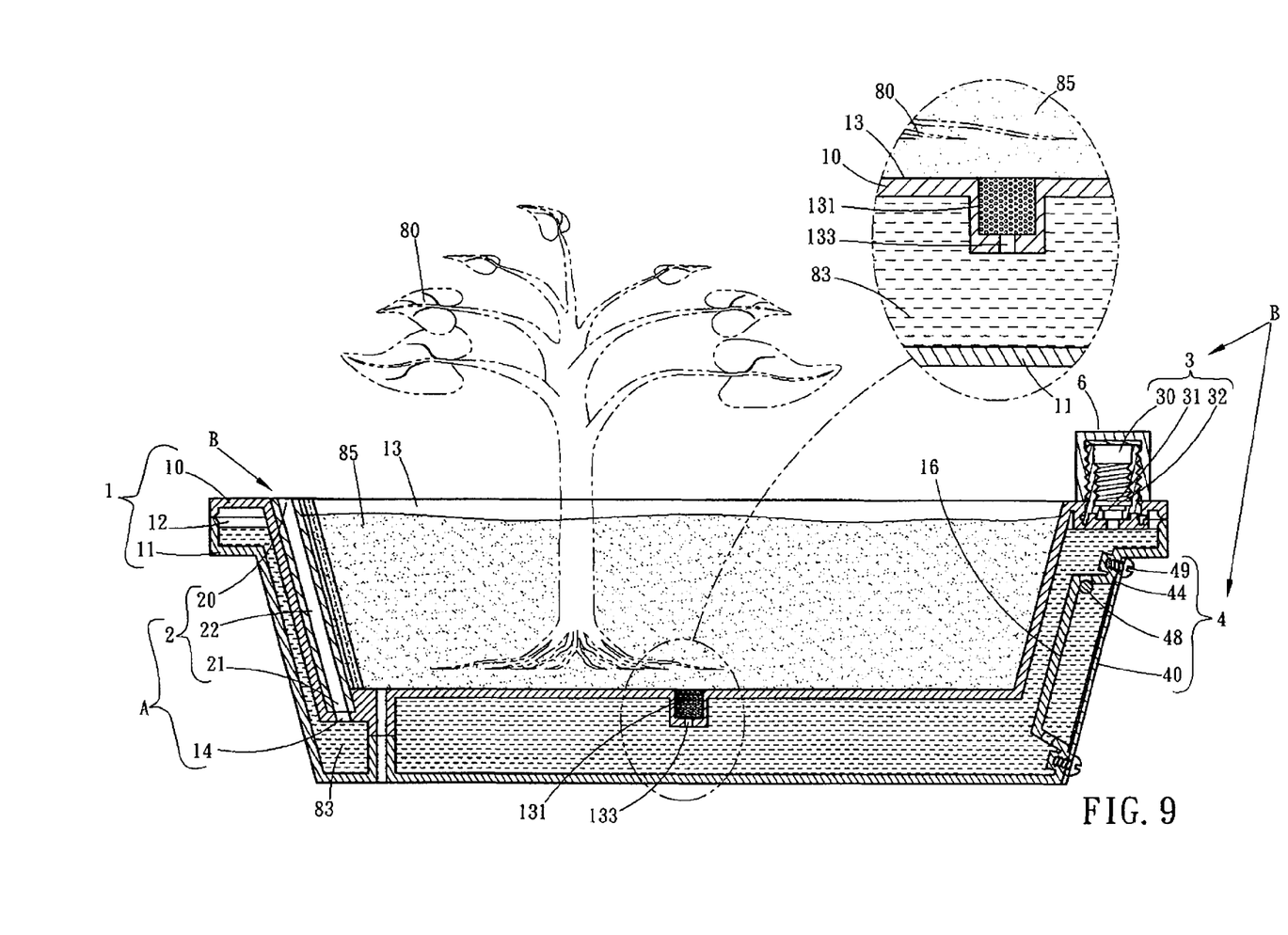
FIG. 9 shows that a plant is planted in the soil in the pot as shown in FIG. 8.
Figure 10:
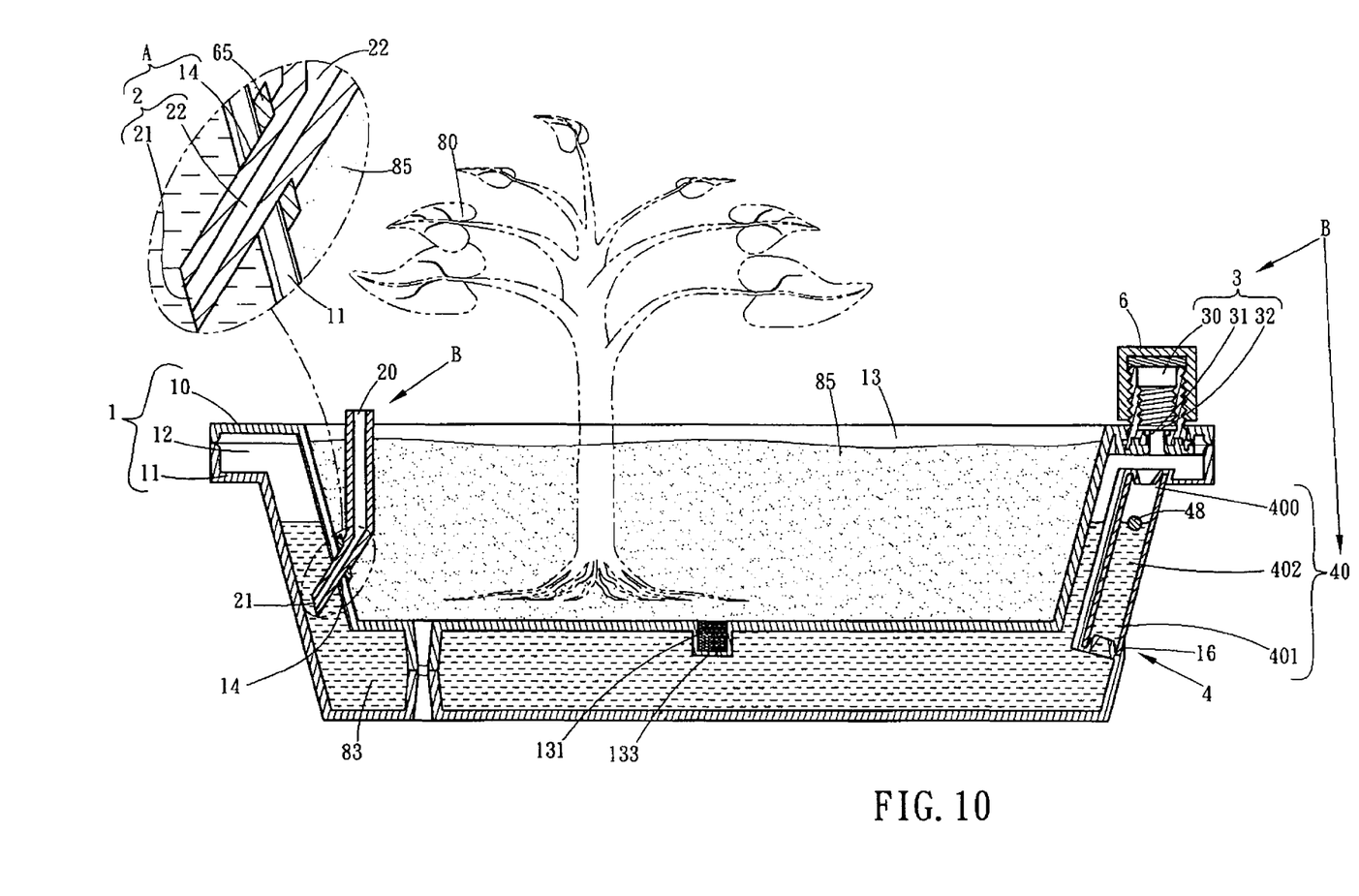
FIG. 10 shows a third embodiment of the pot wherein a plant is planted in the soil in the pot.

The path A has a pipe 2 which is connected between the space 12 and the outside of the pot unit 1. The pipe 2 has a first connection hole 20, a second connection hole 21 and a conjunction area 22 which communicates between the first and second connection holes 20, 21. The second connection hole 21 communicates with the space 12 and the first connection hole 20 is not covered by soil 85 so that the space 12 communicates with the outside of the pot unit 1. The way of the connection of the pipe 2 and the pot unit 1 can be integral injection molding or integrally injection coating as shown in FIGS. 8 to 10, or any known methods such as engagement and screwing.

The connection unit B is a hollow pipe 2 or a hollow water introducing unit 3, or a hollow and transparent window 4. The connection unit B comprises first connection holes 20, 30, 400, second holes 21, 31, 401, and conjunction areas 22, 32, 402 located between the first and second holes 20, 30, 400/21, 31, 401. At least one connection holes 21, 31, 401 is in communication with the space 12 of the pot unit 1 by way of injection molding or injection coating.

Figure 1:
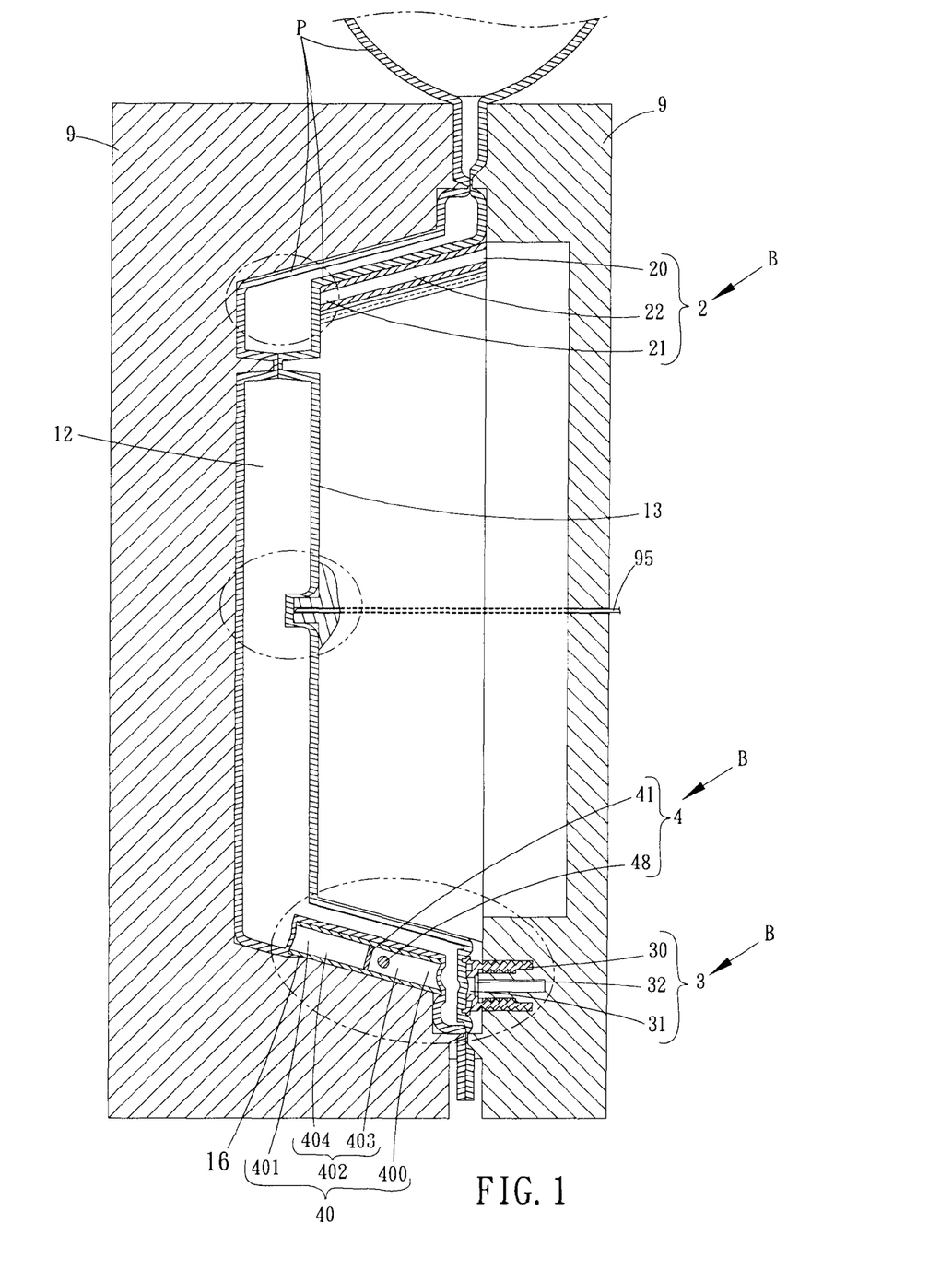
FIG. 1 is a cross sectional view to show the pot unit is made in the mold set.
Figure 1A:
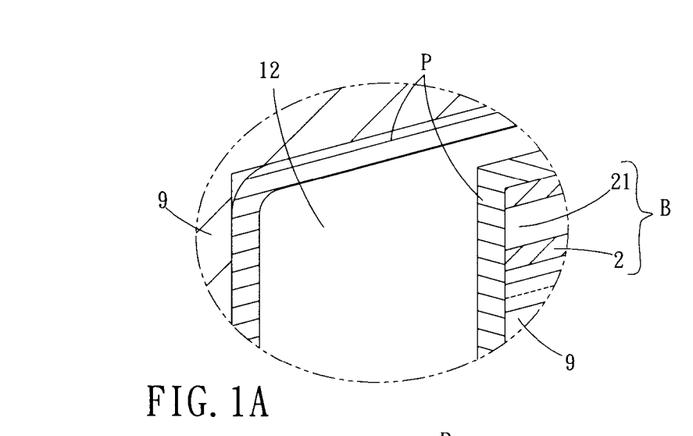
FIG. 1A is a cross sectional view to show the circled area at the top of FIG. 1.
Figure 1B:
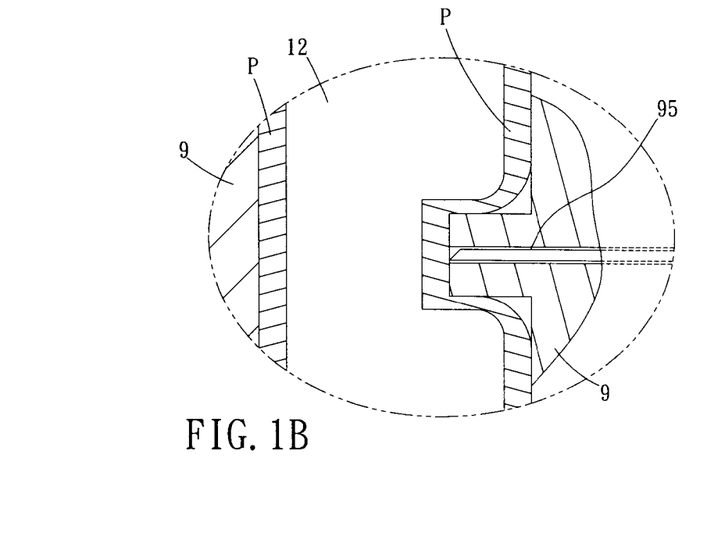
FIG. 1B is a cross sectional view to show the circled area at the middle of FIG. 1.
Figure 1C:
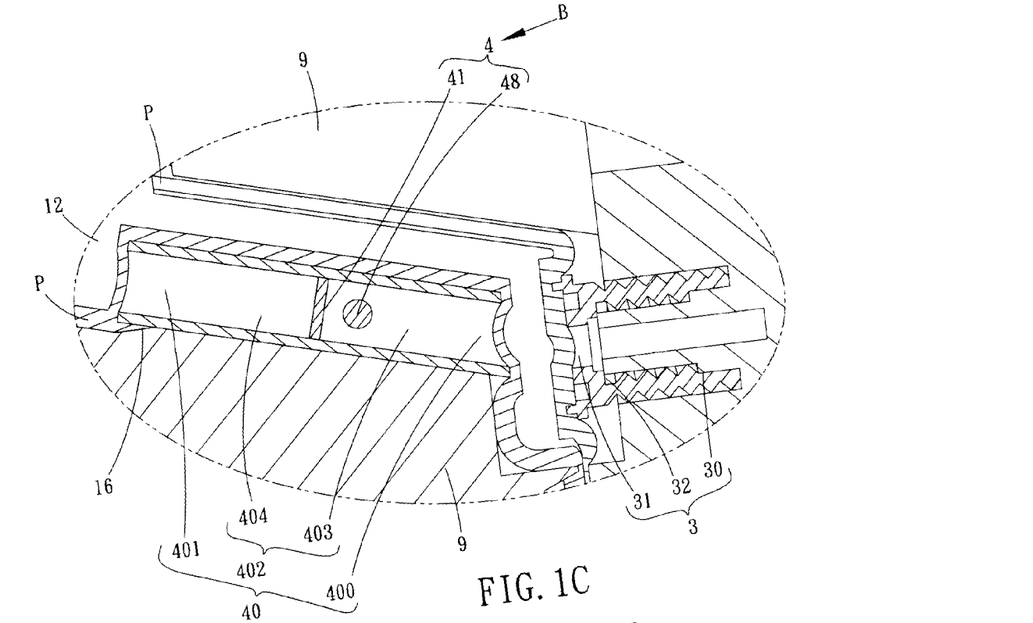
FIG. 1C is a cross sectional view to show the circled area at the bottom of FIG. 1.
Figure 2:
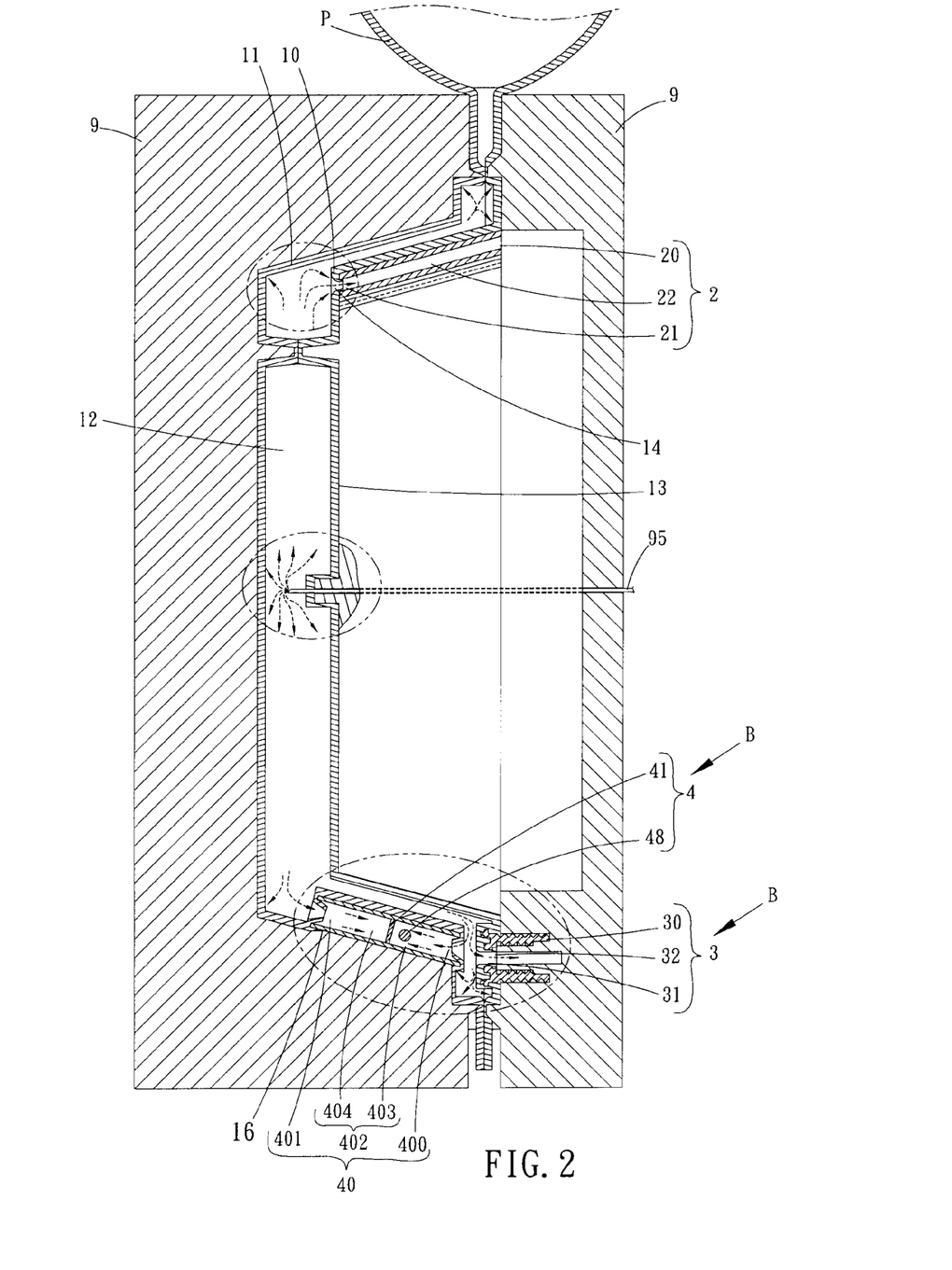
FIG. 2 is a cross sectional view to show air is introduced into the mold set.
Figure 2A:
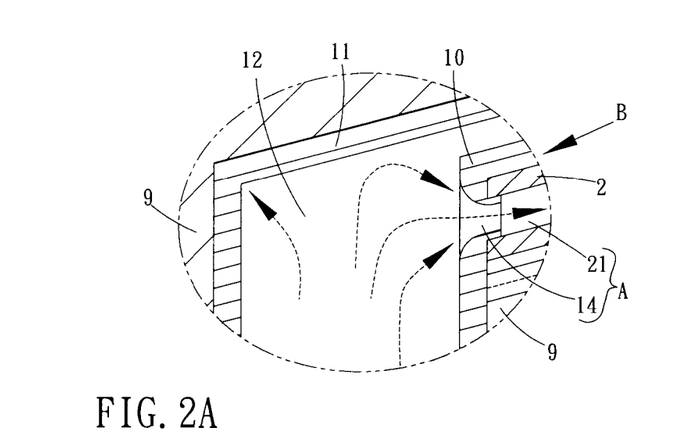
FIG. 2A is a cross sectional view to show the circled area at the top of FIG. 2.
Figure 2B:
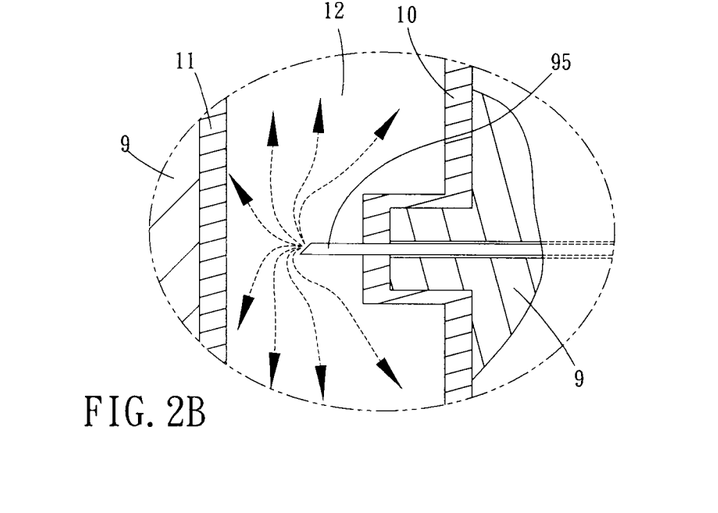
FIG. 2B is a cross sectional view to show the circled area at the middle of FIG. 2.
Figure 2C:
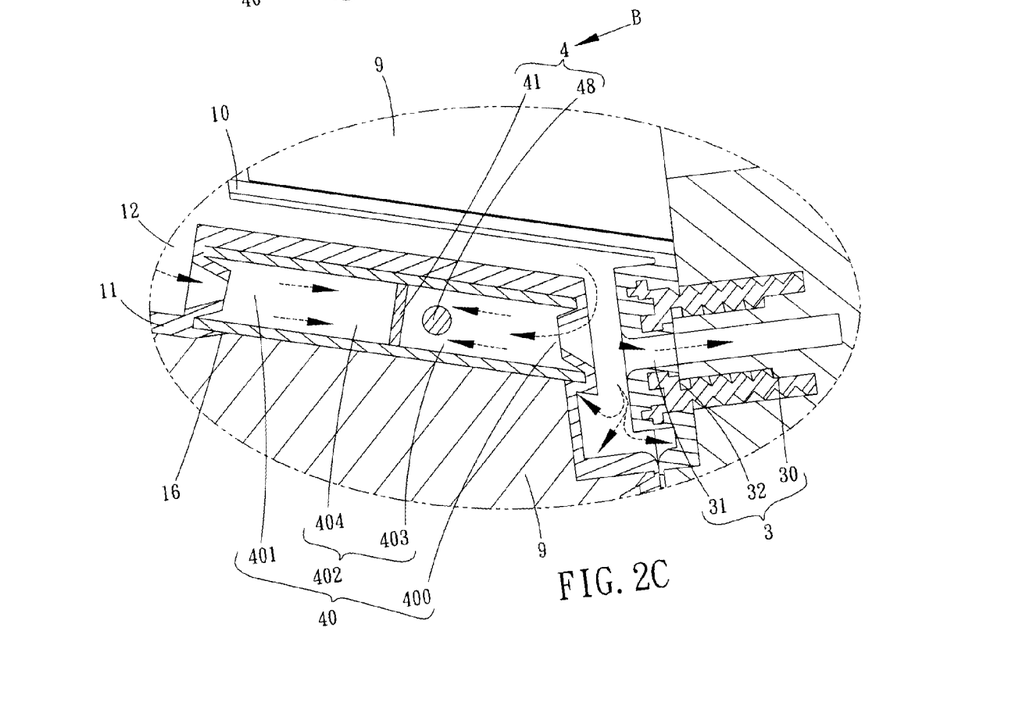
FIG. 2C is a cross sectional view to show the circled area at the bottom of FIG. 2.
Figure 3:
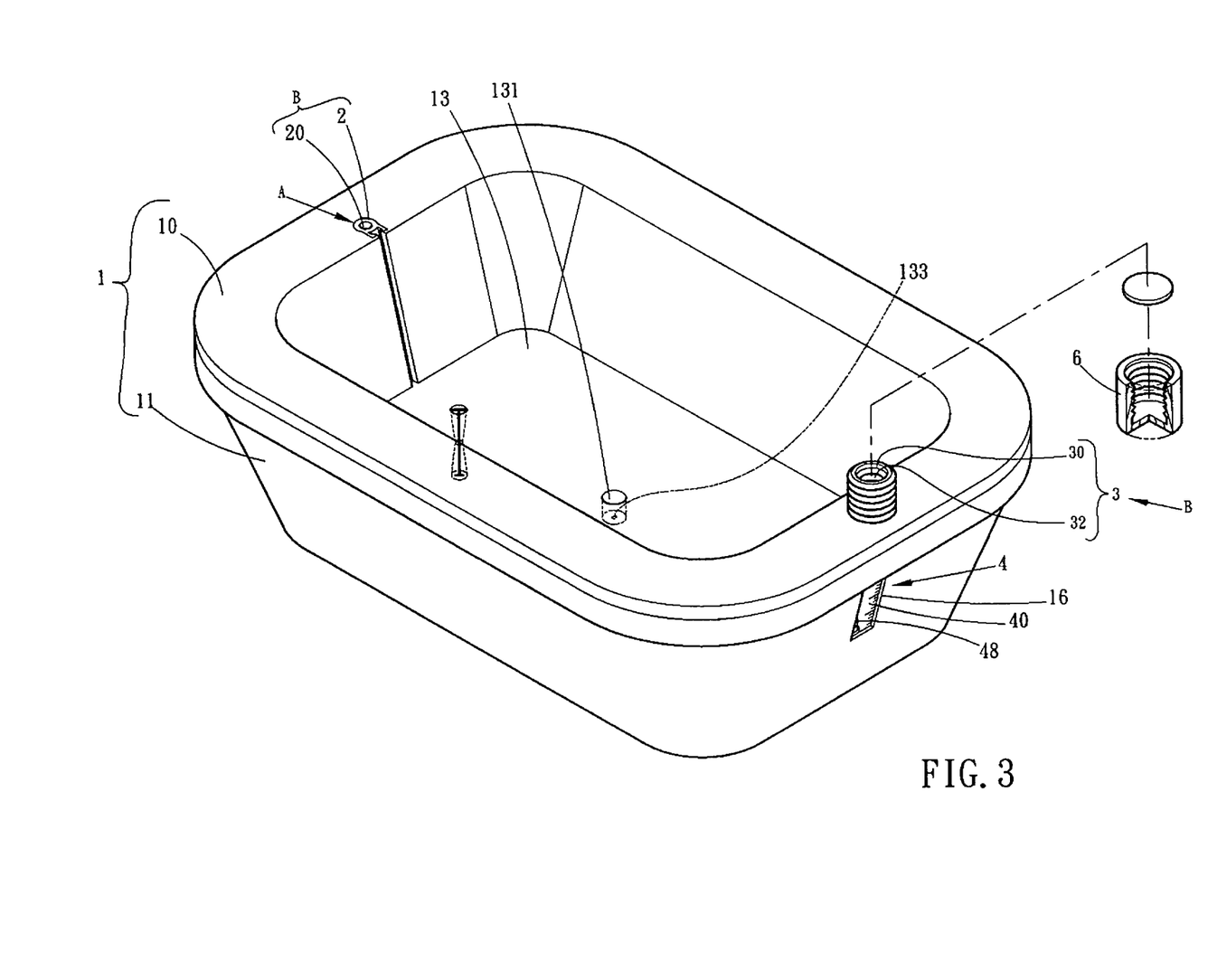
FIG. 3 shows the pot of the present invention.
Figure 4:
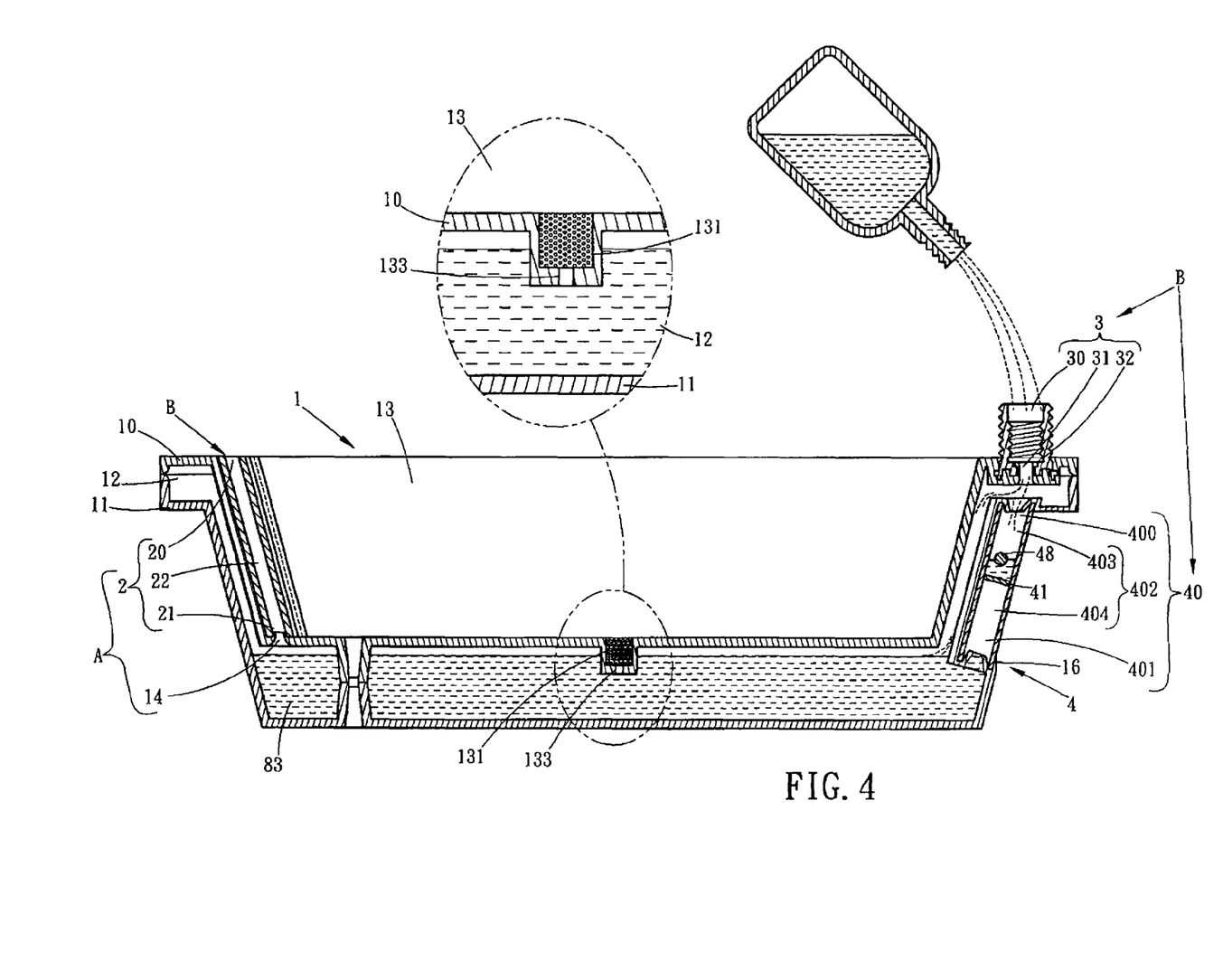
FIG. 4 shows that water is introduced into the space of the pot of the present invention.
Figure 5:
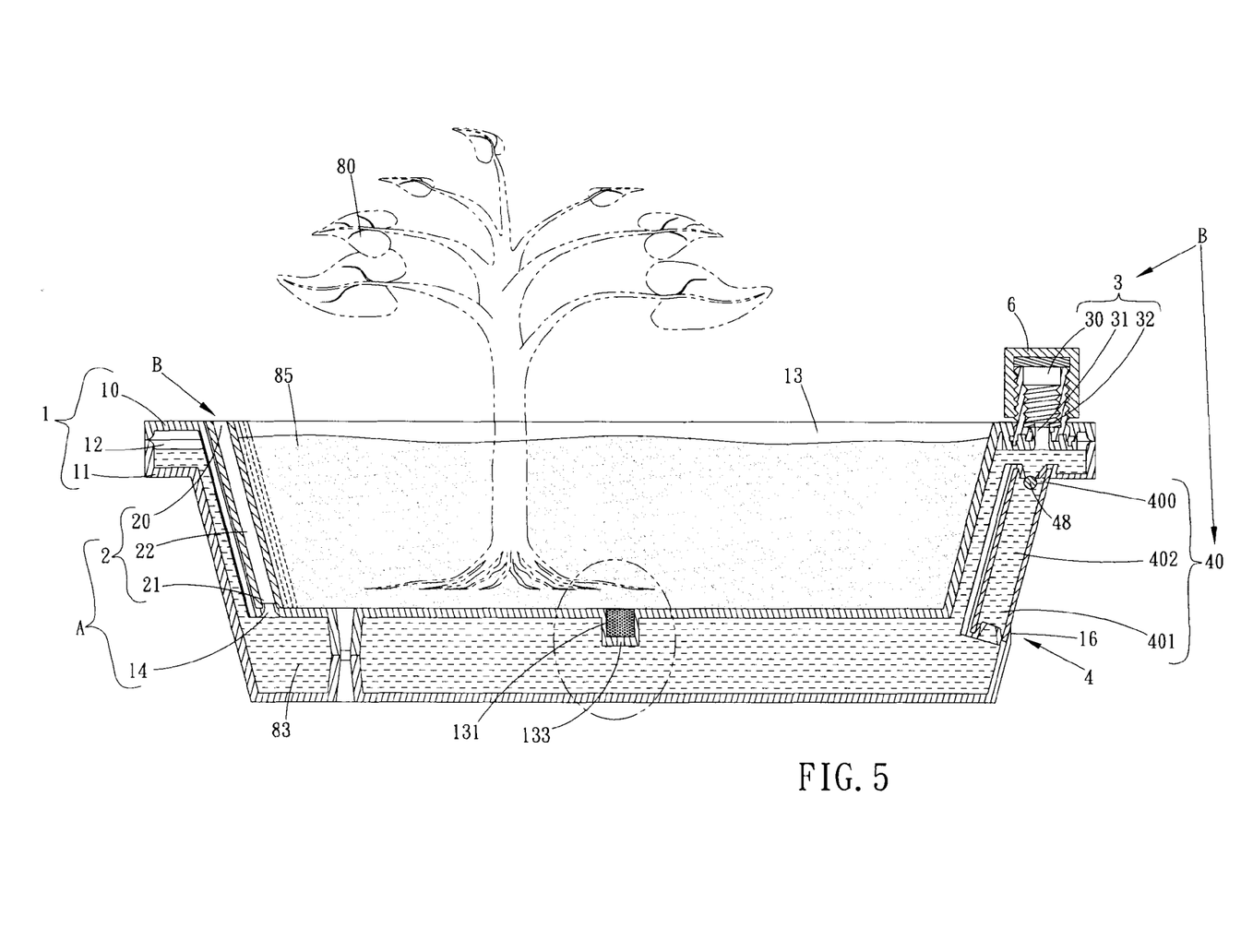
FIG. 5 shows that a plant is planted in the soil in the pot.
Figure 6:
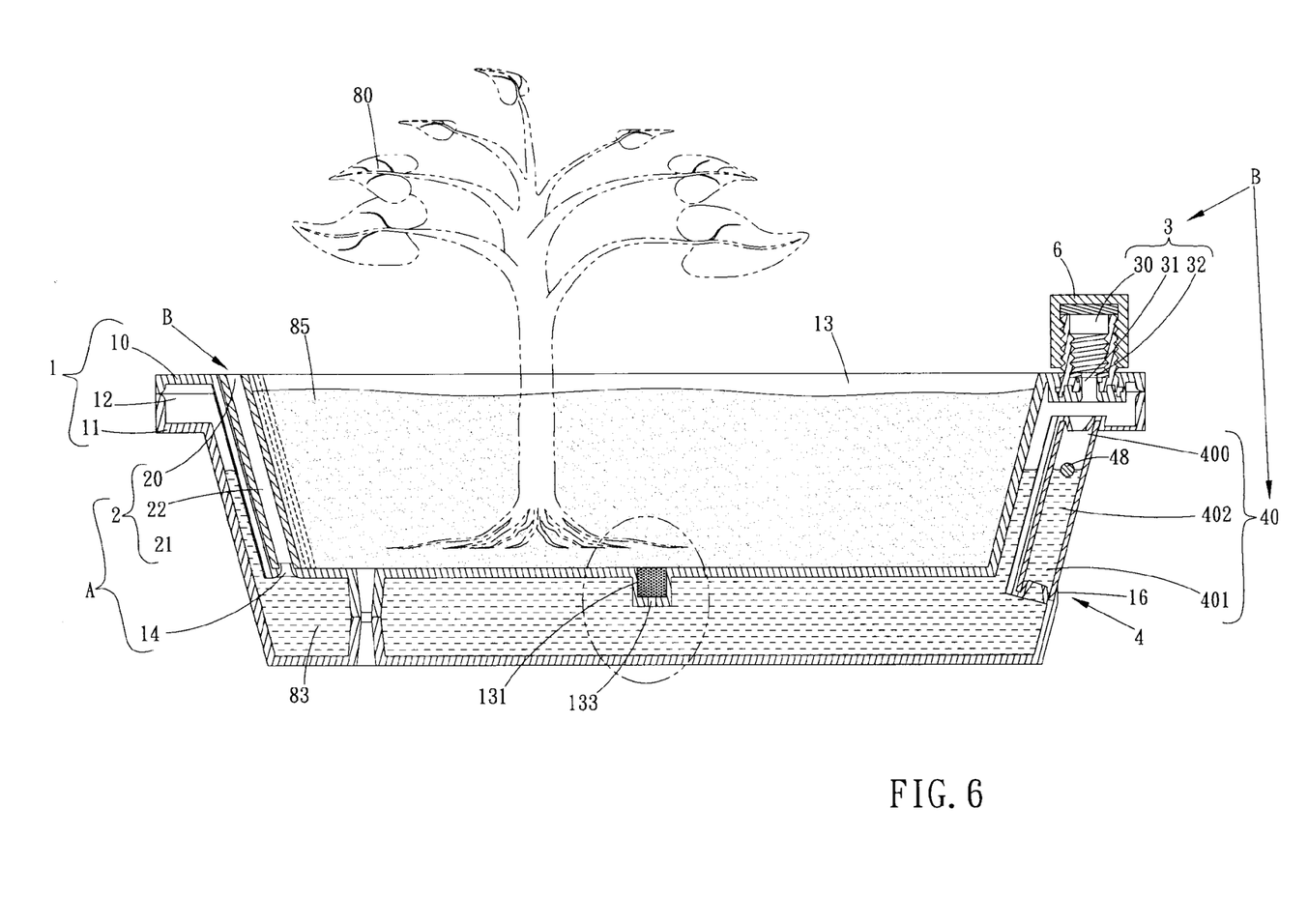
FIG. 6 shows that the level of the water in the pot is lowered.
Figure 7:
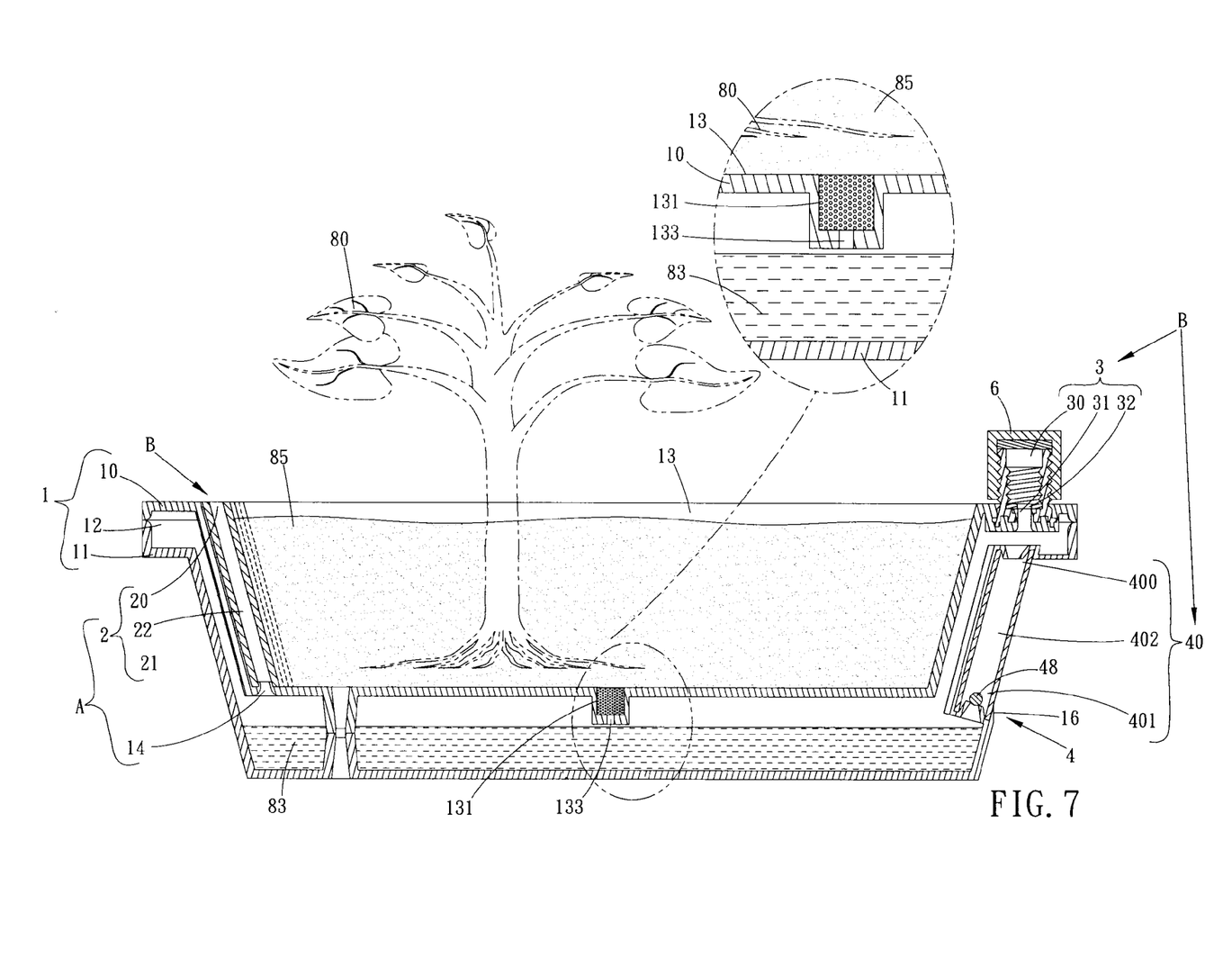
FIG. 7 shows that the level of the water in the pot is further lowered.

When in manufacturing, as shown in FIGS. 1A, 1B and 1C, the connection unit B (such as the hollow pipe 2, the hollow water introducing unit 3 and hollow and transparent member 40) is installed to the inner surface of a mold set 9 before pressurized air is introduced in the mold set 9 and before the mold set 9 is closed. A probe 95 is inserted into the mold set 9 and blows plastic material P in the mold set 9 to expand the plastic material P to contact against the inner surface of the mold set 9 and to seal connection holes 21, 31, 401 of the connection unit B. The plastic material P located outside of the connection holes 21, 31, 401 is forced and pushed into the connection holes 21, 31, 401 due to pressure difference by continuously introducing air into the mold set 9. The plastic material P expands and breaks, and matches upon the connection holes 21, 31, 401 of the connection unit B. The plastic material P is solidified to form the pot unit 1. The pot unit 1 is air-tightly connected to the connection unit B. The conjunction areas 22, 32, 402 of the connection unit B communicate with a space 12 in the pot unit 1 as shown in FIGS. 2A, 2B and 2C. Therefore, the connection unit B is integrally connected to the pot unit 1 in the space 12 and the reception area 13.

When planting a plant 80, the soil 85 is put in the reception area 13 and does not cover the first connection hole 20 of the path A to ensure that the space 12 communicates with outside of the pot unit 1. The liquid 83 such as water is poured into the water introducing unit 3 and the water is guided by the conjunction area 32 and stored in the space 12. When the level of the liquid 83 is higher than the through hole 133. The surface tension of the liquid 83 moves the liquid 83 upward by the siphonic effect and the liquid 83 is absorbed by the soil 85.

The liquid is stopped pouring into the pot unit 1 until the space 12 is filled with the liquid 83. The seal unit 6 is used to seal the water introducing unit 3, an enclosed area is formed between the sealed water introducing area 3 sealed by the seal unit 6 and the through hole 133.

When the plant 80 uses the water in the soil 85, the pressure in the space 12 is smaller than the atmosphere so that the air outside of the pot unit 1 enters into the space 12 via the path A which is the pipe 2, the pressure pushes the level of the liquid 83 downward until the liquid 83 in the space 12 begins to move upward via the through hole 133 by the siphon effect to keep the soil 85 wet. Accordingly, the soil 85 in the reception area 13 maintains a certain level of humidity and the root of the plant is protected. The flow speed of the liquid 83 that 83 flows from the space 12 to the reception area 13 of the soil 85 can also be adjusted to keep the soil to be wet. Therefore, the owner of the plant 80 does not need to water the plant 80 while travelling.

The outer layer 11 of the pot unit 1 has a transparent window 4 which is integrally formed to the outer layer 11. The transparent window 4 has a transparent member 40, or a transparent member 40 and a float 48. The inside of the transparent member 40 has at least two positions communicating with the space 12 so that an enclosed area is formed between the space 12 and the transparent window 4. The float 48 is located at the inside of the transparent window 4, or located in the enclosed area. The level of the liquid 83 and the float 84 are observed via the transparent member 40 or the transparent member 40.

The notch 16 of the outer layer 11 of the pot unit 1 has the transparent window 4 connected thereto. The transparent window 4 has a transparent member 40, a seal member 44 and a third member 49, or the transparent window 4 has a transparent member 40, a seal member 44, a float 48 and a third member 49. The transparent member 40 is installed to the notch 16 of the outer layer 11 of the pot unit 1 by the third member 49. The seal member 44 is located between the transparent member 40 and the outer layer 11 or the notch 16. Therefore, an enclosed conjunction area is formed between the space 12 and the transparent member 40, or between the space 12, the notch 16 and the transparent member 40. There are at least two positions of the conjunction area communicate with the space 12. The float 48 is located at the inside of the transparent member 40 or located in the enclosed area. The level of the liquid 83 in the notch 16 and the float 48 can be observed via the transparent window 4. The transparent member 40 has a first connection hole 400, a second connection hole 401 and a conjunction area 402 located between the first and second connection holes 400, 401. The conjunction area 402 includes a separation unit 41 which defines the conjunction area 402 into top conjunction area 403 and a bottom conjunction area 404. The float 48 is located in the top conjunction area 403 or the bottom conjunction area 404. The separation unit 41 is made by water-resolvable material so that the liquid in the space 12 flows to the conjunction area 402 and solves the separation unit 41, a level of the liquid 83 is observed from the transparent member 40.

The hollow pot of the present invention stores sufficient water so that the users do not need to water the plants when regularly watering the plants is not available. Besides, the water in the hollow pot efficiently isolates the heat from the soil and the plants.

While we have shown and described the embodiment in accordance with the present invention, it should be clear to those skilled in the art that further embodiments may be made without departing from the scope of the present invention.

What is claimed is:

1. A hollow pot comprising:

a pot unit having an inner layer with a reception area defined therein, an outer layer supporting the inner layer, and a space defined between the inner and outer layers, a through hole located in communication between the reception area and the space, a water introducing unit located in communication between the space and outside of the pot unit, a seal unit sealing the water introducing unit so as to form the space, a transparent window located at the outer layer of the pot unit and communicating with the space at two positions so that the transparent window communicates with the space, the outer layer of the pot unit having a notch which has a top end and a bottom end communicating with the space, the transparent window being engaged with the notch and communicating with the space, a level of liquid in the space being observed via the transparent window, the transparent window having a transparent member, a seal member and a third member, the transparent member located on the outer layer of the pot unit by the third member, the seal member located between transparent member and the outer layer or the notch so that a room between the space, the notch and the transparent member is an air-tight room.

2. The hollow pot as claimed in claim 1, wherein the transparent window has a transparent member and a float which is located at inside of the transparent member or located in an area between the space and the transparent member.

3. The hollow pot as claimed in claim 1, wherein the transparent window has a transparent member, a float and a third member, the transparent member is located on the outer layer of the pot unit by the third member, a seal member is located between transparent member and the outer layer or the notch so that a room between the space, the notch and the transparent member is an air-tight room, the float is located at an inside of the transparent member or in the room.

4. The hollow pot as claimed in claim 2, wherein the inner and outer layers of the pot unit are integrally formed by way of air blow molding so that connection between the inner and outer layers is air tight.

5. The hollow pot as claimed in claim 1, wherein the inner and outer layers of the pot unit are integrally formed by way of air blow molding so that connection between the inner and outer layers is air tight.

6. The hollow pot as claimed in claim 3, wherein the inner and outer layers of the pot unit are integrally formed by way of air blow molding so that connection between the inner and outer layers is air tight.

\* \* \* \* \*